(No Model.)

G. H. REYNOLDS.
Hose Coupling.

No. 237,324. Patented Feb. 1, 1881.

Witnesses:

Inventor:
George H Reynolds

UNITED STATES PATENT OFFICE.

GEORGE H. REYNOLDS, OF NEW YORK, N. Y., ASSIGNOR OF TWO-THIRDS TO CORNELIUS H. DELAMATER AND GEORGE H. ROBINSON, OF SAME PLACE.

HOSE-COUPLING.

SPECIFICATION forming part of Letters Patent No. 237,324, dated February 1, 1881.

Application filed December 10, 1880. (No model.)

*To all whom it may concern:*

Be it known that I, GEORGE H. REYNOLDS, of the city and county of New York, in the State of New York, have invented certain new and useful Improvements in Means for Securing Hose to Couplings and other Articles, of which the following is a specification.

My invention relates to the devices commonly used for connecting the ends of hose or flexible pipe with or securing them to the parts of couplings used with said hose or pipe, or to the shanks of cocks used in connection therewith; and said invention is particularly adapted to the hose and flexible pipe employed in connection with compressed air as a motive power for operating rock-drills and similar machines.

The invention consists in the combination, with a nipple adapted to enter a hose or flexible pipe, of a clamp composed of two sections for embracing said hose or pipe, and means for drawing the sections transversely toward each other, one of the said parts being provided with annular grooves or recesses, and the other with annular ribs or projections placed opposite said grooves or recesses, and the said nipple being also provided with a shoulder or shoulders, and said clamp with an inwardly-projecting lip or lips, engaging with said shoulder or shoulders, for holding said clamp in place and securing the hose or pipe firmly in place upon said nipple. The exterior of the nipple is preferably taper, so as to be more readily inserted in the end of a hose or pipe, and said nipple is the part upon which I prefer to form the annular ribs or projections.

The means for drawing the two sections of the clamp transversely nearer together may, with advantage, consist of bolts inserted through both sections of the clamp.

Figure 1:
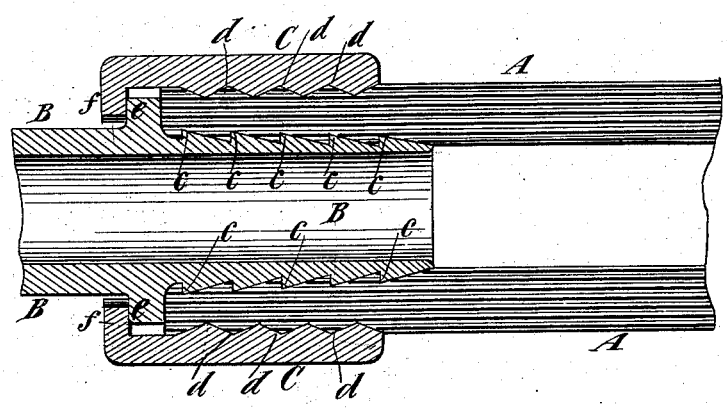
Figure 2:
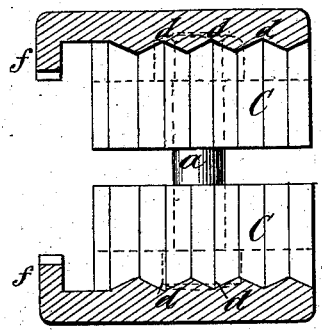
Figure 3:
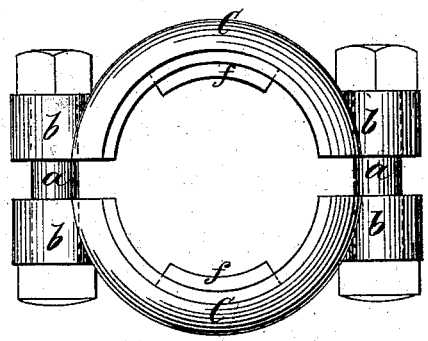

In the accompanying drawings, Figure 1 represents a longitudinal section through a nipple and a piece of hose secured thereto by a clamp embodying my invention. Fig. 2 represents a similar section of the clamp alone; and Fig. 3 represents an end view of said clamp.

Similar letters of reference designate corresponding parts in all the figures.

A designates a hose or flexible pipe of the kind commonly employed for conveying air, water, or other gases or fluids; and B designates a nipple, to which the said hose or pipe is to be secured or connected. The nipple B is here shown as broken off transversely, and it may form part of a coupling or a valve, or may project from any article to which a hose is to be connected. The nipple B is intended to be inserted into the end of the hose or pipe; and in order to facilitate its insertion it is preferably taper upon its exterior, as clearly shown in Fig. 1.

C designates a clamp adapted to embrace the hose or pipe A and hold it upon its nipple B. As clearly shown in Figs. 2 and 3, the clamp C is made in two similar sections connected by screw-bolts *a*, which are inserted through lugs *b*, and by which the sections of the clamp may be drawn transversely nearer together to clamp them both upon the hose or pipe A, and to clamp said hose or pipe upon the nipple B and hold it securely thereon. As here represented, the exterior of the nipple B has formed upon it a number of annular ribs or projections, *c*, and upon its interior the clamp C is provided with annular grooves or recesses *d*, having straight inclined sides and arranged opposite the ribs or projections *c* upon the nipple B, as clearly shown. Upon the nipple B is a shoulder or shoulders, *e*, and upon the clamp C is one or more inwardly-projecting lips, *f*, which engage with said shoulders.

If desirable, the ribs or projections *c*, instead of being upon the exterior of the nipple B, as shown, might be upon the interior of the clamp C, and the annular recesses or grooves *d* would in such case be arranged upon the nipple.

This construction effectually prevents the hose or pipe A from being pulled off the nipple B, inasmuch as the ribs or projections *c* press the said hose into the grooves or recesses *d*, while the inclined surfaces of the latter act as a wedge, forcing the hose or pipe A inward to engage with the ribs or projections *c* when the hose or pipe is pulled outward; and by this construction I provide for connecting a hose or pipe with a nipple or other part in a simple and secure manner.

What I claim as my invention, and desire to secure by Letters Patent, is—

1. The combination, with a nipple adapted to enter a hose or flexible pipe, of a clamp composed of two sections for embracing said hose or pipe, and means for drawing said sections transversely toward each other, one of the said parts being provided with annular grooves or recesses and the other with annular ribs or projections placed opposite said grooves or recesses, the said nipple being also provided with a shoulder or shoulders, and the said clamp with an inwardly-projecting lip or lips, engaging with said shoulder or shoulders, for holding said clamp in place, substantially as and for the purpose specified.

2. The combination of the taper nipple B, provided upon its exterior with annular ribs or projections $c$ and with shoulders $e$, and the sectional clamp C, furnished with bolts $a$, and provided with annular grooves or recesses $d$ opposite the ribs or projections $c$, and with the lips $f$, all substantially as and for the purpose specified.

GEO. H. REYNOLDS.

Witnesses:
HENRY T. BROWN,
FREDK. HAYNES.